Oct. 1, 1940.  E. H. PIRON  2,216,455
TORSION SUSPENSION
Filed Jan. 27, 1938  2 Sheets—Sheet 1
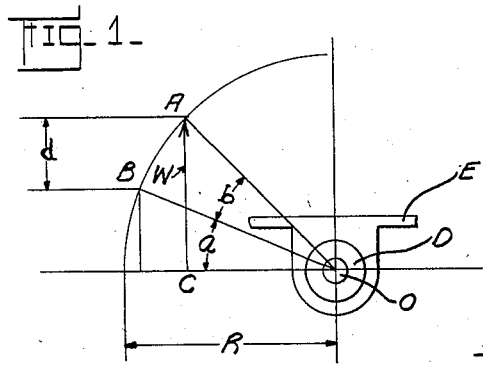
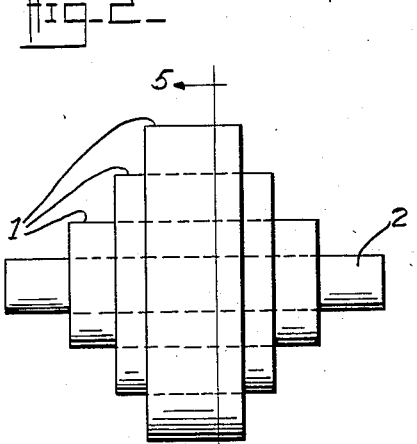
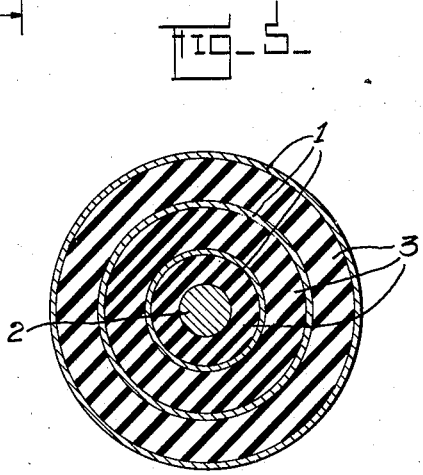
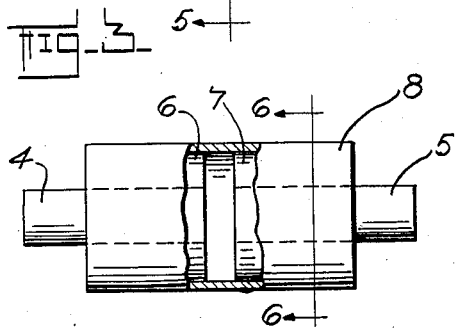
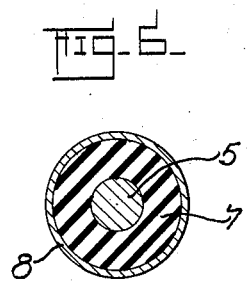
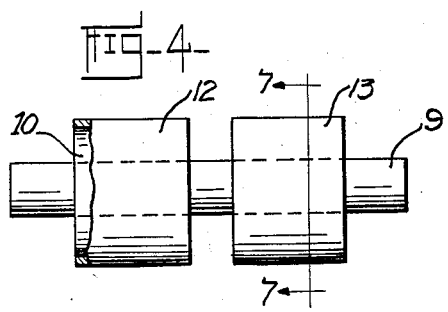
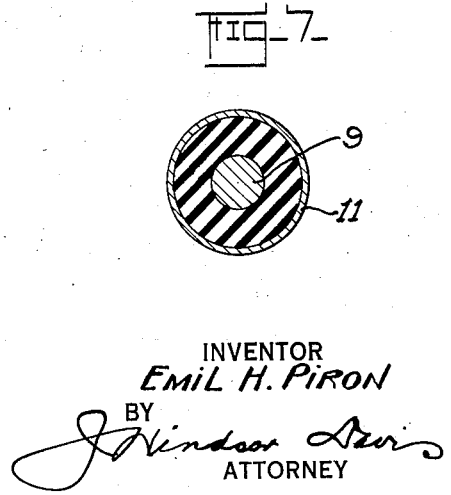
INVENTOR
EMIL H. PIRON
BY
*J. Windsor Davis*
ATTORNEY Oct. 1, 1940.  E. H. PIRON  2,216,455
TORSION SUSPENSION
Filed Jan. 27, 1938  2 Sheets-Sheet 2
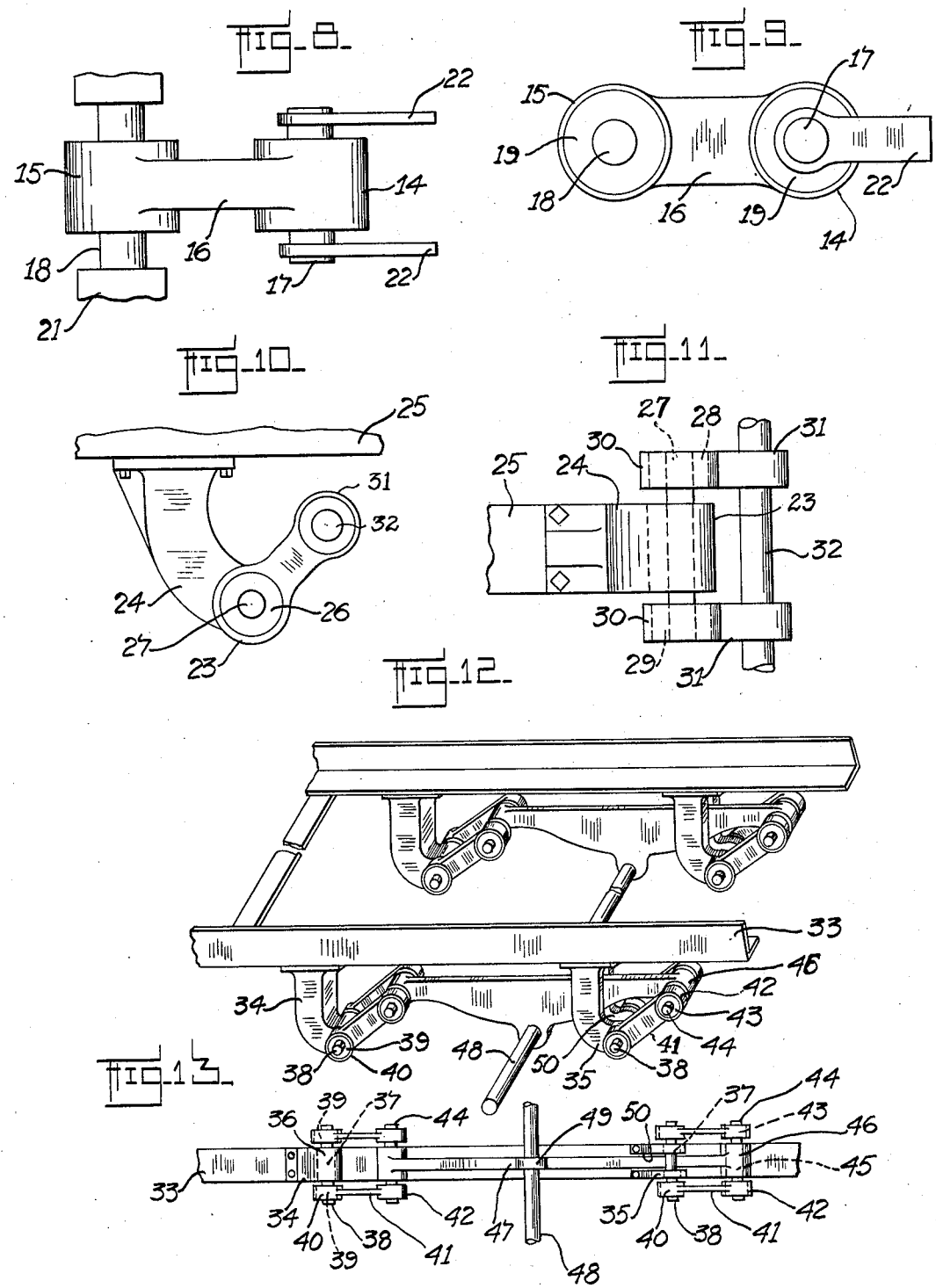
INVENTOR.
EMIL H. PIRON.
BY
ATTORNEY.

Patented Oct. 1, 1940

2,216,455

UNITED STATES PATENT OFFICE 2,216,455

TORSION SUSPENSION

Emil H. Piron, New York, N. Y., assignor to Transit Research Corporation, New York, N. Y., a corporation of New York Application January 27, 1938, Serial No. 187,181

4 Claims. (Cl. 267—21)

This invention relates to vehicle springing systems adapted for heavy service and has for its object to provide a system which will have improved load resisting characteristics, these improved characteristics being substantially uniform over the entire range of loading from minimum to maximum thereby to provide improved riding quality, reduced wear and tear on the vehicle itself and the load being transmitted and prolonged life of the vehicle tires.

Some vehicles such as freight hauling trucks, buses, rail trucks and the like are subjected to extreme variations in load. In the case of some trucks, for instance, the weight of the empty body may be only about three thousand pounds and yet it may be subjected to a loading running from zero to twenty tons. The springs are, therefore, necessarily designed to support the maximum load and hence are, in many cases, substantially without resilience under the weight of the empty body. Such a truck may make a delivery to some distant point and then return empty, at speed. The wear on tires and body during the return trip is many times greater than during delivery which gives an indication of the great importance to the life of the vehicle of good riding quality at all times aside from the breakage and deterioration of a pay load supported by poor springs and aside from rapid deterioration of highways due to this same cause. It is, therefore, a principal object of this invention to provide a spring suspension which will give improved riding quality under maximum loading and which will have equally good riding quality under minimum load conditions.

Elastic material, such as rubber, or its equivalents, have certain inherent advantages for vehicle springing, among which are lack of mechanical friction, prompt response to small movements, freedom from the necessity of lubrication of relatively movable parts, the ability to absorb a substantial amount of energy and adaptability to various designs whereby length may be substituted for width or vice versa and the readiness with which lever arms may be applied thereto.

Another object of the invention is to teach the application of elastic springs to vehicles in such manner as to make use of these several advantages while adapting the design thereof to my invention.

Rubber in shear has many advantages in springing systems as has also rubber in compression. Where spring deflections of considerable magnitude are desirable, however, it is often times more desirable to employ rubber in torsion and the system herein revealed is of this latter type. Torsion springs are advantageous because it is possible to obtain greater resistance to distortions in directions other than the direction of principal loading and because of the facility with which they may be employed in series. The advantages of series springing will now be explained.

The loading must be transmitted from or to a relatively small shaft through rubber in torsion to or from a cylindrical casing. Practical requirements of rubber manufacture limit the possible thickness of rubber to the extent that the outside diameter thereof should not generally exceed about twice the inside diameter and the limit of torsional movement is limited to twenty or twenty-five degrees.

In order to obtain the riding quality herein contemplated it is necessary that the springs have a constant transmission factor, independent of the load, this factor being defined as that proportion of an impulse at the wheels transmitted through the springs to the vehicle body. It is a function of the square of the natural frequency of oscillation of the sprung body or of the ratio $$\frac{k}{w},$$

where $w$ is the load and $k$ the instantaneous value of the characteristic spring ratio and may be expressed as:

$$k = \frac{\text{rate of increase of load}}{\text{rate of increase of deflection}}$$

Analysis of this ratio shows that, if the ratio $k$ is constant for various values of the ratio $$\frac{k}{w}$$

the transmission factor decreases as $w$ increases with the result that a spring having a correct deflection value at minimum load becomes too soft under heavy loads.

In the case of a rubber torsion spring the torque reaction is proportional to the angle of torsion. If the spring is given a lever arm and a vertical load is imposed thereon, the vertical reaction is proportional to the torque reaction divided by the horizontal projection of its lever arm. Figure 1 of the drawings is illustrative of this, the center O indicating the center or axis of a shaft embedded in and rotatable against the resistance of a rubber cylinder D, the cylinder being surrounded by a housing E fixed on a vehicle body. The vertical load $w$ resisted by the torque reaction is proportional to the torque reaction divided by the horizontal projection CO of the spring arm AO which supports the load $w$.

BO is the position of the spring arm when the spring is in its released position. If the angle BOC is indicated as $a$, the angle of distortion AOB as $b$ and the torque reaction is T, the load supported by such a torque is $$w = \frac{T}{R \cos (a+b)}$$

The deflection $$d = [\sin (a+b) - \sin a]$$

where $R = AO$, the length of the spring arm.

Now, it is possible to find a value for $a$ which gives values for $k$ which vary almost in direct proportion with $w$, or some desirable function of $w$, over a wide range of deflection provided the value of $b$ between minimum and maximum load varies through an angle of 40 to 50° but this cannot be done where the variation of $b$ is limited to 20 to 25°. It follows that a successful design for a torsion spring for widely varying loads depends on the possibility of using it through an angle of 40° to 50° or even more as it can then be proportioned so as to produce a springing system with an almost constant natural frequency through the range of various loads encountered in industrial practice. The foregoing leads to the conclusion that a torsion spring expected to give good riding quality under the severe requirements herein contemplated must be composed at least of two elements in series as far as the deflections are concerned, so as to have a torsion angle of approximately 40° or more available for distortion. It is, therefore, an object of the invention to provide a springing system comprising parallel sets of elastic torsion springs arranged in series, the springs of each set being so connected to each other and to the vehicle as to give a substantially constant transmission factor or, even, a transmission factor which increases with the load rather than decreases, as is the case in ordinary springs.

Other objects and advantages will hereinafter become more apparent as reference is had to the accompanying drawings wherein:

Fig. 1 is a diagram of the operation of a torsion spring for purposes of illustration, Figs. 2, 3 and 4 are elevations of different types of series torsional springs, Figs. 5, 6 and 7 are transverse sections taken along the lines 5—5, 6—6, 7—7 respectively of Figs. 2, 3 and 4.

Fig. 8 is a plan view of separate torsion springs arranged in series,

Fig. 9 is a side elevation of the springs of Fig. 8,

Fig. 10 shows a side elevation of a spring of the general type of that of Fig. 4 applied to a vehicle frame, Fig. 11 is a bottom plan view of the spring of Fig. 10, Fig. 12 is a perspective view of the rear of a vehicle frame completely equipped with my improved suspension, and Fig. 13 is a bottom plan view of the suspension of one side of the frame of Fig. 10.

Fig. 1 has been described in the preamble wherein the necessity for springing in series was explained. Series springing may be obtained in several different ways, four of which are herewith illustrated in order to indicate the possible range of design according to the room available and other exigencies.

In Figs. 2 and 5 a plurality of metallic rings 1 are arranged concentrically about a shaft 2 and interposed therebetween are cylinders 3 of elastic material surface bonded to the adjacent metallic members at each surface. If torque loading is applied to the shaft 1, torque is transmitted progressively through the elastic elements.

In Figs. 3 and 6 coaxial shafts 4 and 5 extend through coaxial elastic cylinders 6 and 7 surface bonded to a common cylindrical casing 8. A torque applied to the shaft 4 is transmitted through the element 6 then to the casing 8 then to the element 7 and then to the shaft 5.

In Figs. 4 and 7 a single shaft 9 extends axially through two spaced cylindrical elastic elements 10 and 11 positioned in and surface bonded respectively to housings 12 and 13. A torque applied to the casing 12 is transmitted through the element 10 to the shaft 9 then through the element 11 to the casing 13.

In Figs. 8 and 9 separate springs 14 and 15 are connected for series operation by a link 16 fixedly secured to the outer casings thereof. These springs may each be composed of a cylindrical housing, a central shaft 17 or 18 and cylindrical sleeves of rubber 19 surface bonded to a shaft and housing at its inner and outer surfaces respectively, or they may each be composed of any of the springs described in connection with Figs. 2 to 7. One shaft 18 is non-rotatably secured to one or more levers or torque arms 22. This form of spring grouping has certain advantages such as good stability against horizontal forces, absence of mechanical friction at any joint and hence absence of operating troubles generally caused by lubrication, clearance adjustments and the like. The fixed relation of the arms 22 and the shaft 17 should be particularly noted. If vertical loading without the torque arm is imposed on the shaft 17 there will be a simple cushioning action by the element 19 thereabout and, in response to movement of the arm 16, the other element 19 will thereafter be subjected to torsion.

Figs. 10 and 11 illustrate an application of torsion springs to a vehicle in accordance with my invention. Any of the springs illustrated in Figs. 2 to 7 inclusive may be used but for purposes of instruction a modified form of the spring of Figs. 4 and 7 is chosen. One spring is composed of a casing 23 fixedly secured to a bracket 24 attached to a vehicle frame member 25, the casing containing a cylinder 26 of rubber to the interior surface of which a shaft 27 is surface-bonded. This shaft projects outwardly of the rubber at both ends for extension through additional rubber cylinders 28 and 29, to which it is surface bonded. The exterior surfaces of the sleeves 28 and 29 are surface-bonded. The exterior surfaces of the sleeves 28 and 29 are surface-bonded to housings 30 each of which is fixedly secured to torque arms 31 in which an axle 32 is journalled. The springs 28, 29 and 30 may be considered as half springs in which case the similarity to the spring of Figs. 4 and 7 will be obvious.

The frame member 25 is considered to be substantially horizontal. Under empty body load conditions of the body carried on the frame member 25, the torque arm 31 is given an initial angularity with respect to the vertical, preferably between 40° and 50° or some angle determined to be best suited for the intended service. If T is the torque, and R is the distance between the centers of the shafts 27 and 32, the weight supported is $$W = \frac{T}{R \cos (a+b)}$$

The arrangement shown in Figs. 12 and 13 has certain advantages over that above described and is a compounding of the sets of series springs of the types illustrated in Figs. 8 and 9 and also Figs. 10 and 11. There is a complete set of springs at each side of the vehicle frame 33, the sets being identical in construction and consequently only one will be referred to.

Two brackets 34 and 35 are secured to the frame 33 in longitudinally spaced relation. Each bracket is integral with or fixedly secured to a spring housing 36 to the interior of which an elastic sleeve 37 is surface-bonded. A shaft 38 extends through the sleeve 37 and outwardly of each end thereof for extension through the rubber sleeves 39. Enclosing each sleeve 39 is a housing 40 having a torque arm 41 each of which is integrally or fixedly secured to a housing 42 which encloses a sleeve of rubber 43. A second shaft 44 extends axially through the sleeves 43 and through a further sleeve 45 placed between the sleeves 43, the sleeve 45 being housed by a casing 46 which is fixedly or integrally secured to a torque arm 47. The arm 47 is common to the two series of longitudinally spaced springs and constitutes a beam for attachment of the vehicle axle 48 thereto, the axle being journalled therein at 49. From the foregoing it will be seen that the two series of longitudinally spaced springs are identical except for the brackets 34 and 35, the bracket 35 being preferably divided at 50 in order to centralize the beam with respect thereto.

It will be understood, in connection with the foregoing description, that the sleeves 37, 39, 43 and 45 are in contact with and preferably surface bonded to their respective housings and shafts.

The illustration shows the approximate spring positions under empty body or no pay-load conditions. The torque arms 41, therefore, have an angle with the horizontal, and if T is the torque reaction of each element (assuming these elements to be identical), the torque reaction of a spring with torsion elements at each end of the spring arm is 2T and the equation for the load becomes $$W = \frac{2T}{R \cos(a+b)}$$

This invention may be developed within the scope of the following claims without departing from the essential features of the said invention and it is desired that this specification and drawings be read as being merely illustrative and not in a limiting sense, except as necessitated by the prior art.

What I claim is:

1. A vehicle suspension comprising a frame and a pair of rigid elongate beams residing on opposite sides of the vehicle with each extending fore and aft thereof, a bearing for an axle carried by each of said beams, torsion spring means connected to said frame at each end of each of said beams, and a torque arm connected to each of said spring means and pivotally connected to the adjacent beam, said torque arms all extending in like directions and normally residing at like angles with respect to both the horizontal and the vertical.

2. A vehicle suspension comprising a frame and a pair of rigid elongate beams residing on opposite sides of the vehicle with each extending fore and aft thereof, a bearing for an axle carried by each of said beams, torsion spring means connected to said frame at each end of each of said beams, and a torque arm connected to each of said torsion springs and connected through an elastic sleeve to the adjacent beam, the torque arms all extending in like directions and normally residing at like angles with respect to both the horizontal and the vertical.

3. A vehicle suspension comprising a frame and a pair of rigid elongate beams residing on opposite sides of the vehicle with each extending fore and aft thereof, a bearing for an axle carried by each of said beams, torsion spring means connected to said frame at each end of each of said beams, a torque arm connected to each of said spring means and pivotally connected through an elastic sleeve to the adjacent beam, all of said torque arms extending in like directions and at like angles, said sleeve in each case also comprising a torsion spring.

4. A vehicle suspension comprising a frame, a pair of elongate beams, one at each side of the vehicle and extending fore and aft thereof, an axle bearing carried by each of said beams, a plurality of elastic springs at each end of said beams arranged in series to resist vertical loading imposed by said beams in torsion, torque arms connecting said beams and said springs, said torque arms extending in like directions and at like angles, and a plurality of elastic springs arranged in series to resist vertical loading in torsion constituting the connection of said torque arms to the ends of said beams.

EMIL H. PIRON.